United States Patent Office

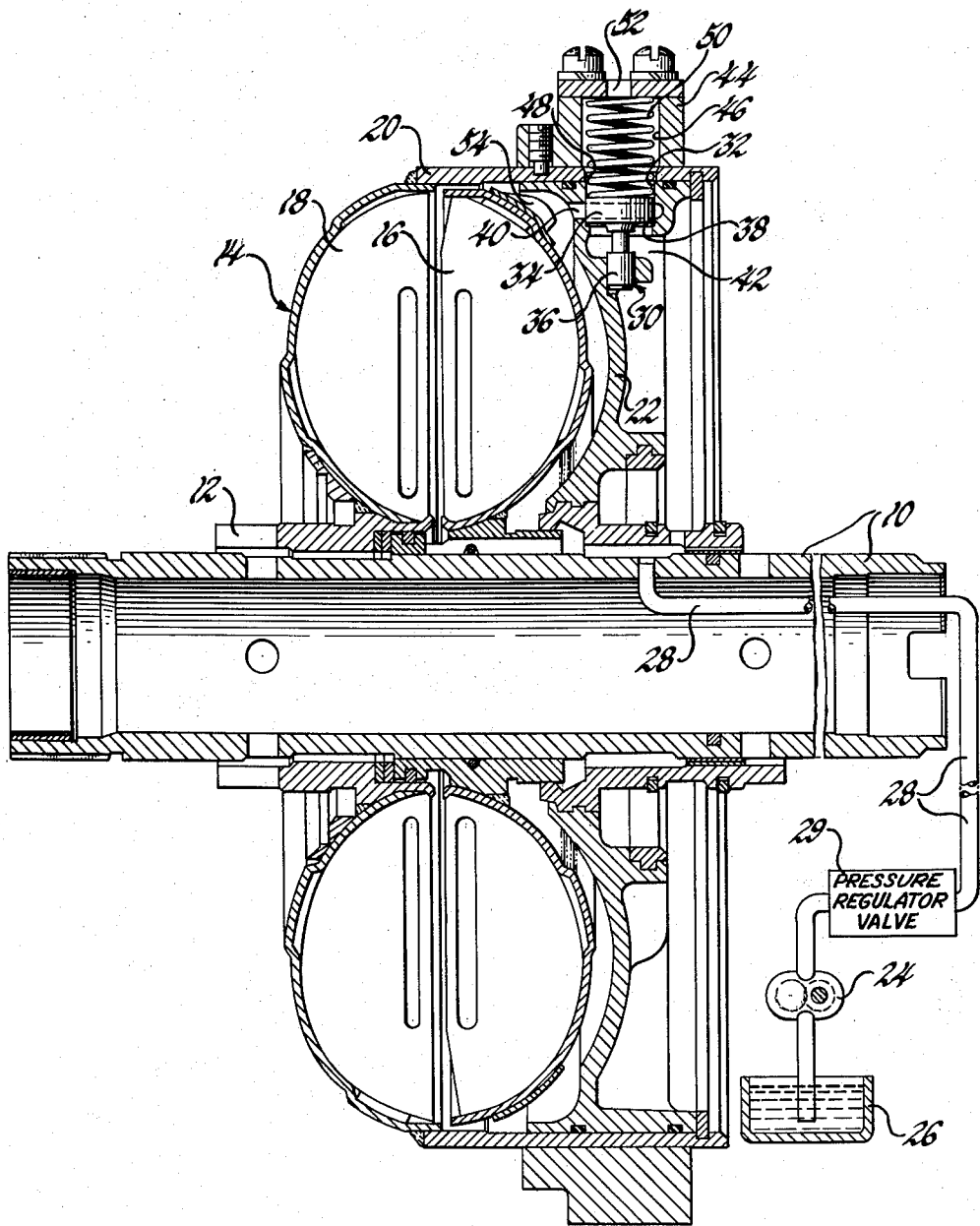

3,116,608
Patented Jan. 7, 1964

3,116,608
TRANSMISSION
William Margolin, Detroit, Mich., assignor to General Motors Corporation, Detroit, Mich., a corporation of Delaware
Filed Apr. 7, 1958, Ser. No. 726,916
8 Claims. (Cl. 60—54)

This invention relates to transmissions and particularly to transmissions of the type adapted, although not exclusively, for driving vehicle accessories at regulated speeds.

Frequently, in the transmission of power it is necessary, for various reasons, to regulate the speed of the output. An example of this is demonstrated by a drive for vehicle accessories, e.g., fans, generators, compressors, and the like, where it is desired to limit the speed at which one or more of the accessories is driven. Normally, the accessories are driven by the engine, and therefore, as engine speed increases, the speed at which the accessories are driven likewise increases. If this speed is too fast, excessive wear occurs and conceivably the accessories could be permanently damaged. Generally, each of the accessories has some optimum speed for most efficient operation, and this ideal speed should not be exceeded even though the accessory load does change.

With the foregoing in mind, the invention contemplates a transmission which is arranged and constructed to maintain the output speed thereof relatively constant despite load changes.

Another objective of the invention is to provide a power transmission of the foregoing character with a hydrodynamic torque transmitting device, the quantity of fluid in the working circuit of which is varied so as to maintain the output speed relatively constant at some predetermined level with changes in load.

More specifically, the invention employs a centrifugally operated valve for controlling the quantity of fluid in the working circuit of a hydrodynamic torque transmitting device and thereby maintains the speed of the output for the device relatively constant with load changes. Also, the invention affords an inertia arrangement for reducing the effect of speed fluctuations on the operation of the valve.

Moreover, the invention seeks to provide a hydrodynamic torque transmitting device that is not only efficient for transmitting drive, but also effective in assisting the discharge of fluid from the working circuit.

In carrying out the invention, according to one form thereof, a hydrodynamic torque transmitting device is installed between a power source and a load and includes an impeller member and a turbine member together defining a fluid working circuit. A passage is provided from the working circuit to the exterior of the device, which passage is controlled by a centrifugally operated valve arranged to be revolvable with the turbine of the device. After the desired speed of the output is exceeded, the centrifugal force acting on the valve will be sufficient to move the valve and establish communication through the passage between the working circuit and the exterior of the device. In this manner, the quantity of fluid in the working circuit is altered so as to maintain the output speed constant at the selected level despite changes in load thereon.

To assist the valve in discharging fluid, one of the hydrodynamic torque transmitting device members is provided with external vanes or paddles in the vicinity of the passage. These vanes function to direct the fluid in the working circuit to the passage for discharge when the valve opens.

A weighted member is included in the structure for reducing fluctuations in turbine speed. By this member the inertia derived therefrom will tend to stabilize the speed of the turbine by resisting temporary increases and decreases in speed which would, otherwise, interfere with the operation of the valve.

The foregoing and other objects and advantages of the invention will be apparent from the following description and from the accompanying drawing in which a preferred embodiment of the invention is illustrated.

Referring to the drawing, the numeral 10 denotes an input shaft, which may be driven by the engine crankshaft (not shown), and the numeral 12 denotes an output shaft, which may, in any desired manner, drive the vehicle accessories, such as a generator, fan water pump, air conditioning compressor, etc. Drive is transferred between the shaft 10 and 12 by a hydrodynamic torque transmitting device, such as a fluid coupling 14 comprising a vaned impeller 16 and a vaned turbine 18 positioned in confronting relation to define a fluid working circuit. A sleeve 20 is secured to the outer edge of the turbine 18, which sleeve is, in turn, connected to a shroud 22 so as to afford a fluid tight enclosure for the coupling 14.

Fluid for the coupling working circuit is supplied by a suitable pump 24 driven preferably by the engine. When the pump 24 is revolved fluid will be drawn from a sump 26 and delivered to the coupling 14 by a supply line 28. A pressure regulator valve 29, of any appropriate construction, may be provided in the supply line 28 to maintain the charging pressure within the fluid coupling working circuit at some selected level. Since fluid slippage is less with a full coupling, the fluid coupling 14 should be designed with the torque requirements of the particular installation in mind so as to be filled when transmitting the required torque. Therefore, with the coupling transmitting approximately the maximum design torque at the desired operating speed, fluid losses will be reduced to a minimum, thereby obtaining maximum efficiency.

To control the speed of the output shaft 12, a centrifugally operated valve 30 is installed within a stepped bore 32 extending radially outwardly from the outer part of the shroud 22. The valve 30 which has an enlarged control land 34 slidable in the large part of the bore 32 and a guide land 36 slidable in the small part of the bore 32 is constructed in the closed position to seat against a shoulder 38 near the bottom of the large part of the bore 32. In this closed position communication between an inlet passage 40 near the outer diameter of the coupling impeller 16 and a spaced exhaust passage 42 extending to the exterior of the shroud 22 is interrupted by the control land 34. When the valve 30 is shifted upwardly towards an open position, the valve lands 34 and 36 permit communication between the inlet and exhaust passages 40 and 42.

On the periphery of the sleeve 20 an annular drum 44, is installed and has a pocket 46 therein aligned with both an opening 48 in the sleeve 20 and the upper end of the stepped bore 32. A spring 50 is housed within the pocket 46 and urges the valve 30 to the depicted closed position against a shoulder 38. The weight of the annular member 44 is selected to produce a "flywheel effect" and thereby reduce the influence of fluctuations in turbine speed on the operation of the valve 30, as will be explained. Any leakage fluid in the pocket 46 is exhausted by a drain opening 52 in the annular member 44.

In operation, with the coupling 14 being supplied fluid pressure, and the input shaft 10 commencing to drive, the fluid in the coupling 14 will be urged outwardly to establish a working circuit in which the fluid revolves in a counterclockwise direction. When the torque transmitted by the fluid in the working circuit is sufficient to overcome the load on the output shaft 12, the turbine 18 will commence to revolve in the same direction as the impeller 16. As the speed of the input shaft 10 increases and more fluid is added to the working circuit of the coupling 14, the torque transferred to the output shaft 12 will likewise be increased until the fluid coupling 14 is filled and is capable of transmitting the maximum torque. The coupling 14 will continue operating in this manner until some predetermined speed of the turbine 18 is exceeded. Then centrifugal force acting on the valve 30 will move it upwardly against the bias from the spring 50 and open the inlet passage 40 to the exhaust passage 42. The exit of the fluid from the working circuit through the passage 40 is assisted by a series of paddles or vanes 54 formed on the pump 24 in the vicinity of the entrance to the inlet passage 40. The quantity of fluid in the working circuit will, therefore, be decreased which will slow down the turbine 18 and the output shaft 12 to slightly below the predetermined control speed. At this time the valve 30 will again close because of the reduced centrifugal force acting thereon interrupting communication between the inlet and exhaust passage 42. The coupling 14 will refill and the valve 30 will continuously operate, as just described, to maintain the speed of turbine 18 relatively constant at the predetermined speed level chosen. When the valve 30 is regulating, the fluid in the working circuit is continuously being discharged and replaced with cool fluid, thereby insuring against overheating of fluid in the working circuit.

During operation, due to various factors, such as changes in the load, fluctuations in the speed of the turbine 18 occur which are absorbed or reduced over a selected range by the inertia effect from the weight of the annular member 44. In other words, with acceleration as an example, any tendency for the turbine speed to suddenly increase and then instantly reduce requires the weight of the annular member 44 to be also accelerated and decelerated. However the weight resists and absorbs these fluctuating tendencies so that they become relatively imperceptible and do not interfere with the operation of the valve 30.

From the foregoing, it can be seen that the arrangement provides a substantially constant predetermined output speed dspite changes in load end variations in the speed of the input shaft 10. The centrifugally operated valve 30 with the assistance of impeller vanes 54 operates instantly to reduce the quantity of fluid in the coupling working circuit whenever the speed of the turbine 18 exceeds the predetermined control speed. Sudden increases and decreases in the turbine speed are resisted by the weight of annular member 44 which also combines with the coupling fluid to absorb shocks and jars that might otherwise damage the driven accessories. Moreover, by driving the vehicle accessories at a constant speed, the optimum and most efficient operating speed can be maintained, thereby protecting the accessories against damage and extreme wear resulting from excessive speeds. Consequently, an overall gain in operating efficiency is achieved. Also, with the working circuit being continuously supplied with cool fluid, the valve 30 must necessarily operate likewise continuously to discharge fluid so that the proper quantity of fluid is maintained, an important cooling feature.

The invention is to be limited only by the following claims.

I claim:

1. The combination of a hydraulic torque transmitting device including an impeller and a turbine together defining a fluid working circuit, a source of fluid for the working circuit, a valve body revolvable with the turbine and having a bore therein, the valve body including an inlet passage extending between the working circuit and the bore and an exhaust passage extending from the bore to the exterior of the device, and a valve slidable in the bore to and from an open position in which communication between the inlet and exhaust passages is established, the valve being urged toward the open position by centrifugal force acting thereon when the turbine is revolved to control the quantity of fluid in the working circuit and thereby maintain the speed of the turbine relatively constant at a predetermined value with changes in load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value.

2. The combination of a hydraulic torque transmitting device including an impeller and a turbine together defining a fluid working circuit, a source of fluid for the working circuit, a valve body revolvable with the turbine and having a bore therein, the valve body including an inlet passage extending between the working circuit and the bore and an exhaust passage extending from the bore to the exterior of the device, a valve slidable in the bore to and from an open position in which communication between the inlet and exhaust passages is established, the valve being urged toward the open position by centrifugal force acting thereon when the turbine is revolved to control the quantity of fluid in the working circuit and thereby maintain the speed of the turbine relatively constant at a predetermined value with changes in load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, and an inertia member of predetermined weight revolvable with the turbine for reducing the effect of fluctuations in the speed of the turbine on control of turbine speed by the valve.

3. The combination of a hydraulic torque transmitting device including impeller and turbine members together defining a fluid working circuit, a source of fluid for the working circuit, a valve body revolvable with the turbine and having a bore therein, the valve body including an inlet passage extending between the working circuit and bore and an exhaust passage extending from the bore to the exterior of the device, a valve slidable in the bore to and from an open position in which communication between the inlet and exhaust passages is established, the valve being urged toward the open position by centrifugal force acting thereon when the turbine is revolved to control the quantity of fluid in the working circuit and thereby maintain the speed of the turbine member relatively constant at a predetermined value with changes in load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, and auxiliary vanes on one of the members of the device for directing fluid from the working circuit towards the inlet passage.

4. The combination of a hydraulic torque transmitting device including impeller and turbine members together defining a fluid working circuit, a source of fluid for the working circuit, a valve body revolvable with the turbine and having a bore therein, the valve body including an inlet passage extending between the working circuit and bore and an exhaust passage extending from the bore to the exterior of the device, a valve slidable in the bore to and from an open position in which communication between the inlet and exhaust passages is established, the valve being urged toward the open position by centrifugal force acting thereon when the turbine is revolved to control the quantity of fluid in the working circuit and thereby maintain the speed of the turbine member relatively constant at a predetermined value with changes in load thereon, auxiliary vanes on one of the members of the device for directing fluid from the working circuit towards the inlet passage, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, and an inertia member of predetermined weight revolvable with the turbine member for reducing the effect of turbine speed fluctuations on the control of the turbine speed by the valve.

5. The combination of a hydraulic torque transmitting device including an impeller and a turbine together defining a fluid working circuit, a source of fluid for the working circuit, a valve body revolvable with the turbine and positioned near the periphery of the turbine, the valve body having a radially outwardly extending bore and including an inlet passage extending between the bore and the working circuit and an exhaust passage spaced from the inlet passage and extending from the bore to the exterior of the device, a valve having a control land, the valve being slidable in the bore between a closed position in which the control land interrupts communication between the inlet and exhaust passages and an open position in which the control land establishes communication between the inlet and exhaust passages, a spring for urging the valve element to the closed position, the valve being urged towards the open position by centrifugal force acting thereon when the turbine is revolved so as to control the quantity of fluid in the working circuit and thereby maintain the speed of the turbine relatively constant at a predetermined value with changes in the load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, and an inertia member of predetermined weight revolvable with the turbine for reducing the effect of fluctuations in the speed of the turbine on the control of turbine speed by the valve, the inertia member having a pocket formed therein and aligned with the valve body bore so as to form an enclosure for the spring.

6. The combination of a hydraulic torque transmitting device including impeller and turbine members together defining a fluid working circuit, a source of fluid for the working circuit, a valve body revolvable with the turbine and positioned near the periphery of the turbine, the valve body having a radially outwardly extending bore and including an inlet passage extending between the bore and the working circuit and an exhaust passage spaced from the inlet passage and extending from the bore to the exterior of the device, a valve having a control land, the valve being slidable in the bore between a closed position in which the control land interrupts communication between the inlet and exhaust passages and an open position in which the control land establishes communication between the inlet and exhaust passages, a spring for urging the valve element to the closed position, the valve being urged towards the open position by centrifugal force acting thereon when the turbine member is revolved so as to control the quantity of fluid in the working circuit and thereby maintain the speed of the turbine relatively constant at a predetermined value with changes in the load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, and auxiliary vanes on one of the members of the device for directing fluid from the working circuit towards the inlet passage.

7. The combination of a fluid coupling including an impeller and a turbine together defining a fluid working circuit; a source of fluid for the working circuit; a shroud for the device revolvable with the turbine; the shroud having radially outwardly extending large and small diameter aligned bores and including a valve seat between the large and small bores, an inlet passage closely adjacent the periphery of the turbine and extending between the working circuit and the large bore, and an exhaust passage extending from between the small bore and large bore to the exterior of the device; a valve having a large control land slidable in the large bore and a small guide land slidable in the small bore; an annular member positioned on the periphery of the turbine and including a spring pocket in alignment with the bores in the shroud, a spring mounted in the spring pocket for urging the valve to the closed position in which the control land is in engagement with the valve seat so as to interrupt communication between the inlet and exhaust passages, the valve being urged by centrifugal force acting thereon when the turbine is revolved towards an open position in which communication between the inlet and exhaust passages is established so as to control the quantity of fluid in the working circuit and thereby maintain the speed of the turbine relatively constant at a predetermined value with changes in load thereon, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value, the annular member being of a predetermined weight for reducing the effect of sudden changes in the speed of the turbine on the control by the valve, and auxiliary vanes on the exterior of the impeller for directing fluid from the working circuit to the inlet passage.

8. The combination of a hydraulic torque transmitting device including an impeller and a turbine together defining a fluid working circuit, a source of fluid for continuously supplying the working circuit, a valve body revolvable with the turbine and positioned near the periphery of the turbine, the valve body having a radially outwardly extending bore and including an inlet passage extending between the bore and the working circuit and an exhaust passage spaced from the inlet passage and extending from the bore to the exterior of the device, a valve having a control land, the valve being slidable in the bore between a closed position in which the control land interrupts communication between the inlet and exhaust passages and an open position in which the control land establishes communication between the inlet and exhaust passages, and a spring for urging the valve element to the closed position, the valve being urged towards the open position by centrifugal force acting thereon when the turbine is revolved so as to control the quantity of fluid in the working circuit and thereby maintain the speed of the turbine relatively constant at a predetermined value with changes in the load thereon, the valve operating continuously so as to exhaust fluid from the working circuit and allow continuous circulation through the device for cooling the fluid in the circuit, the valve being operative in a certain range of turbine speeds to reduce the exhaust of fluid from the device as the turbine speed tends to decrease below the predetermined value and to increase the exhaust of fluid from the device as the turbine speed tends to increase above the predetermined value.

References Cited in the file of this patent

UNITED STATES PATENTS

| | | |
|---|---|---|
| 1,855,032 | Sinclair | Apr. 19, 1932 |
| 1,873,688 | Walker | Aug. 23, 1932 |
| 2,049,673 | Starr | Aug. 4, 1936 |
| 2,195,561 | Dickerson | Apr. 2, 1940 |
| 2,224,884 | Schneider et al. | Dec. 17, 1940 |
| 2,240,650 | Heyer | May 6, 1941 |
| 2,256,878 | Black | Sept. 23, 1941 |
| 2,335,106 | Carter | Nov. 23, 1943 |
| 2,534,517 | Jenny | Dec. 19, 1950 |
| 2,539,004 | Becker | Jan. 23, 1951 |